United States Patent [19]

Heimberg et al.

[11] 4,267,090

[45] May 12, 1981

[54] PROCESS FOR PREPARING VINYL ACETATE-ETHYLENE COPOLYMER LATICES

[75] Inventors: Manfred Heimberg, Cincinnati; Louis J. Rekers, Wyoming, both of Ohio

[73] Assignee: National Distillers and Chemical Corp., New York, N.Y.

[21] Appl. No.: 5,070

[22] Filed: Jan. 22, 1979

[51] Int. Cl.$^3$ .................... C08L 23/08; C08L 31/04
[52] U.S. Cl. .................... 260/29.6 R; 260/29.6 ME; 260/29.6 WA; 260/29.6 RB; 260/17 A; 260/17.4 ST; 526/80; 526/81
[58] Field of Search .............. 260/29.6 R, 29.6 ME, 260/29.6 WA, 29.6 RB, 17 A, 17.4 ST; 526/80, 81

[56] References Cited

U.S. PATENT DOCUMENTS

| 3,423,352 | 1/1969 | Levine et al. ............... 260/29.6 ME |
| 3,578,618 | 5/1971 | Beardsley ..................... 260/29.6 R |
| 3,644,262 | 2/1972 | Stehle et al. ................... 260/29.6 R |
| 3,844,990 | 10/1974 | Lindemann et al. ........... 260/29.6 R |
| 4,128,518 | 12/1978 | Oyamada et al. ............... 260/29.6 R |

FOREIGN PATENT DOCUMENTS

| 994380 | 6/1965 | United Kingdom . |
| 1112863 | 5/1968 | United Kingdom . |
| 1133556 | 11/1968 | United Kingdom . |
| 1133867 | 11/1968 | United Kingdom . |
| 1229989 | 4/1971 | United Kingdom . |
| 1233837 | 6/1971 | United Kingdom . |

*Primary Examiner*—Harold D. Anderson
*Attorney, Agent, or Firm*—Kenneth D. Tremain

[57] ABSTRACT

Vinyl acetate-ethylene copolymer latices having an inherent viscosity of not less than about 1.90 and demonstrating superior performance in the Time of Set Test and Vinyl Wetting Test are prepared by the process which comprises copolymerizing from about 60% to about 95% by weight of vinyl acetate monomer with from about 40% to about 5% by weight of ethylene monomer in an emulsified reaction medium containing:
  (a) at least one surface active agent in an amount of not less than about 1.0% by weight, and not more than about 2.0% by weight, of the total monomer,
  (b) a catalyst, and
  (c) a protective colloid, the total weight of the surface active agent and vinyl acetate monomer being introduced into the reaction medium in delayed increments prior to and after the commencement of copolymerization.

8 Claims, No Drawings

PROCESS FOR PREPARING VINYL ACETATE-ETHYLENE COPOLYMER LATICES

BACKGROUND OF THE INVENTION

Vinyl acetate ethylene (VAE) copolymer latices have found considerable application as bases for paints and other surface coatings, as adhesives, textile treating agents, and the like. A large body of technology has developed over the years both in respect to processes for preparing these commercially important latices and to their end uses.

In general, a VAE copolymer latex is prepared by first charging an aqueous phase containing water, surfactant, buffer, catalyst or catalyst system of the free radical type, and usually a protective colloid such as polyvinyl alcohol (PVA), to a reactor. In some procedures, an initial charge of vinyl acetate monomer, and in others, the entire amount of vinyl acetate monomer, is also charged to the reactor. The reactor is flushed with nitrogen, sealed and stirring is commenced. Ethylene is then pumped to the reactor until the desired pressure is attained. The reactor can be repressurized one or more times if the batch is carried out under variable ethylene pressure, or a constant pressure can be maintained automatically employing techniques which are well known in the art. After reactor pressure has stabilized, the contents thereof are heated to the polymerization temperature, usually by circulating hot water or steam through a jacket surrounding the reactor. When the desired polymerization temperature (commonly from about 120° to about 165° F.) is reached, temperature is maintained at this level by automated controls. Thereafter, a co-catalyst such as sodium hydrogen sulfite (NaHSO$_3$) can be added to the reactor (if a catalyst system employing a reducing agent to generate free radicals by a redox reaction is used) followed by any remaining vinyl acetate monomer. The completion of polymerization is indicated by cessation of ethylene demand and stabilization of the reactant coolant temperature at about 6°–8° F. above the reactor temperature. Upon completion of polymerization, the reactor contents are cooled and discharged through a pressure let-down valve to a storage tank at atmospheric pressure from which unreacted ethylene is vented. The finished VAE copolymer latex is passed through a screen of desired mesh to complete the manufacturing process.

Of the various tests available for measuring the physical properties/performance characteristics of VAE copolymer latices, two of the most significant are the Time of Set Test and the Vinyl Wetting Test. The Time of Set Test is a measurement of the relative adhesive set time of a VAE copolymer latex on a kraft paper substrate. This test is highly significant for packaging applications since the rate of set of the adhesive determines the operating speed of the packaging line. As is readily appreciated, a faster time of set is directly translatable to improved packaging economics. The Vinyl Wetting Test measures the relative wettability of flexible vinyl film by a VAE copolymer latex adhesive. This property is significant in relation to the commercially important application of latex adhesives for lamination of various substrates to flexible vinyl film.

Inherent viscosity is a very important physical property of VAE copolymer latices and has been found to directly influence the performance of the latices in yet another significant performance test, the Creep Test. This test measures the resistance to delamination of an adhesive bond under an applied load at elevated temperature. In general, the higher the inherent viscosity of a VAE copolymer latex, the better its performance will be in the Creep Test.

Various manipulations of both the amount and nature of the components of a VAE copolymerization medium and the copolymerization process variables have heretofore been attempted in order to optimize one or a few properties of the resulting latex. U.S. Pat. No. 3,644,262 describes a copolymerization which by regulating the addition of vinyl acetate to an aqueous emulsifying composition containing a free-radical initiator at a rate which will maintain the concentration of unpolymerized vinyl acetate at a level not exceeding about 3.5% by weight of emulsifying composition and, optionally by delaying the addition of surface active agent, permits the introduction of substantially more ethylene into the copolymer for a given pressure and temperature than would be otherwise attainable. The resulting high ethylene content VAE copolymer latices are said to be better adapted to their end uses than the latices of relatively low ethylene content. A different approach to improved VAE copolymer latices is described in U.S. Pat. No. 3,423,352 in which high solids content VAE copolymer latices of reduced viscosity and improved freeze-thaw stability are obtained by controlling the addition of monomer, catalyst and surfactant. According to this patent, relatively large amounts of surfactant, i.e., from about 3% to about 10% by weight, and catalyst are added to a conventionally prepared polyvinyl acetate latex, having a solids content of up to about 52% and containing relatively large amounts of vinyl acetate, at specified times once polymerization has proceeded to a certain extent. This is said to result in a marked reduction in the viscosity of the emulsion. Frequently, these and other prior art techniques for preparing VAE copolymer latices achieve an improvement in one or two performance characteristics but at the expense of one or more other vital performance characteristics. Thus, for example, superior performance in the Vinyl Wetting Test may be attained but at a substantial or even total loss of performance in the Creep Test.

SUMMARY OF THE INVENTION

It has now been discovered that by combining relatively low surface active agent level with a multipart addition of the surface active agent and vinyl acetate monomer during the course of the VAE copolymerization reaction, VAE copolymer latices having excellent Time of Set and Vinyl Wetting Test performance characteristics, and at the same time an entirely acceptable Creep Test performance characteristic, can be attained.

Broadly, the process for preparing VAE copolymer latices of this invention comprises copolymerizing a major amount of vinyl acetate monomer and a minor amount of ethylene monomer contained in an aqueous emulsion containing a total of not less than 1.0% and not more than 2.0% surface active agent by weight of total comonomers, a catalyst and a protective colloid, one portion of said surface active agent and said vinyl acetate monomer being present in the emulsion at the beginning of the copolymerization reaction, and the balance of said surface active agent and said vinyl acetate monomer being added to the emulsion in at least one delayed increment during the progress of the copolymerization reaction.

The resulting latices, due to their excellent combination of properties, are particularly well suited for use in the manufacture of flexible vinyl film and in packaging operations.

DESCRIPTION OF THE PREFERRED EMBODIMENTS

The amount of vinyl acetate monomer copolymerized with ethylene monomer will vary from about 60% up to about 95% by weight of the total comonomer charge, the balance of said charge being made up of ethylene, and if desired, small quantities of one or more other ethylenically unsaturated comonomers not exceeding the weight quantity of ethylene. Included among such additional comonomers are monoethylenically unsaturated aliphatic hydrocarbons such as propylene and isobutylene; monoethylenically unsaturated substituted aliphatic hydrocarbons such as vinyl fluoride, vinyl chloride, vinyl bromide, vinylidene fluoride, 1-chloro-1-fluoroethylene, chlorotrifluoroethylene and tetrafluoroethylene; unsaturated acids such as acrylic acid, methacrylic acid, crotonic acid and itaconic acid, as well as polymerizable derivatives thereof, e.g. alkyl acrylates and methacrylates such as methyl acrylates, ethyl acrylate, n-propyl acrylate, n-butyl acrylate, isobutyl acrylate, 2-ethylhexyl acrylate, methyl methacrylate, ethyl methacrylate, n-propyl-methacrylate and isobutyl methacrylate, acrylonitrile, methacrylonitrile, acrylamide, methacrylamide, N-methylolacrylamide, alkylated N-methylolacrylamides such as N-methoxymethylacrylamide and N-butoxymethylacrylamide, and acrolein; aliphatic vinyl esters such as vinyl formate, vinyl propionate and vinyl butyrate; aliphatic vinyl ethers such as methyl vinyl ether, ethyl vinyl ether and n-butyl vinyl ether; vinyl ketones such as methyl vinyl ketone, ethyl vinyl ketone and isobutyl vinyl ketone; allyl esters of saturated monocarboxylic acids, e.g. allyl acetate, allyl propionate and allyl lactate; and, alkyl esters of monoethylenically unsaturated dicarboxylic acids, e.g., diethyl maleate, dibutyl maleate, dioctyl maleate, dipropyl fumarate, dibutyl fumarate, dioctyl fumarate, dodecyl fumarate, dibutyl itaconate and dioctyl itaconate.

The surface active agents contemplated by this invention include any of the known and conventional surfactants and emulsifying agents, principally the nonionic and anionic materials, and mixtures thereof heretofore employed in the emulsion copolymerization of vinyl acetate and ethylene, the nonionic surfactants being especially preferred. Among the nonionic surface active agents which have been found to provide good results are included the "Igepals" (G.A.F.), the "Tweens" (Atlas Chemical) and the "Pluronics" (BASF Wyandotte). The "Igepals" are members of a homologous series of alkylphenoxypoly(ethyleneoxy) ethanols which can be represented by the general formula

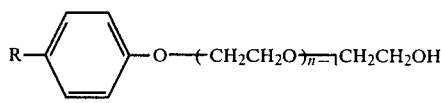

wherein R represents an alkyl radical and n represents the number of mols of ethylene oxide employed, among which are alkylphenoxypoly(ethyleneoxy) ethanols having alkyl groups containing from about 7 to about 18 carbon atoms, inclusive, and having from about 4 to about 100 ethyleneoxy units, such as the heptylphenoxypoly(ethyleneoxy) ethanols, nonylphenoxypoly(ethyleneoxy) ethanols and dodecylphenoxypoly(ethyleneoxy) ethanols; the sodium or ammonium salts of the sulfate esters of these alkylphenoxypoly(ethyleneoxy) ethanols; alkylpoly(ethyleneoxy) ethanols; alkylpoly(propyleneoxy)ethanols; octylphenoxyethoxyethyldimethylbenzylammonium chloride; polyethylene glycol t-dodecylthioether. The "Tweens" are polyoxyalkylene derivatives of hexitol (including sorbitans, sorbides, mannitans and mannides) anhydride partial long-chain fatty acid esters, such as the polyoxyalkylene derivatives of sorbitan monolaurate, sorbitan monopalmitate, sorbitan monostearate, sorbitan tristearate, sorbitan monooleate and sorbitan trioleate. The "Pluronics" are condensates of ethylene oxide with a hydrophobic base formed by condensing propylene oxide with propylene glycol, and the like. Other suitable nonionic surfactants which can be employed herein are ethylene oxide derivatives of long chain fatty alcohols such as octyl, dodecyl, lauryl or cetyl alcohol.

It is essential to obtaining the good combination of properties which is characteristic of the VAE copolymer latices of this invention that at least 1.0% and not more than 2.0% surface active agent by weight of total comonomers be used. Below the aforesaid minimum quantity of surface active agent, VAE copolymer latices will fare poorly in the Time of Set Test; above this amount, inherent viscosities will tend to be lower than that desired. From about 1.2% to about 1.5% total surface active agent is especially preferred.

In accordance with this invention, a protective colloid is incorporated in the aqueous emulsions. Such known and conventional protective colloids as: the partially and fully hydrolyzed polyvinyl alcohols; cellulose ethers, e.g., hydroxymethyl cellulose, hydroxyethyl cellulose, ethyl hydroxylethyl cellulose and ethoxylated starch derivatives; the natural and synthetic gums, e.g. gum tragacanth and gum arabic; polyacrylic acid, poly (methyl vinyl ether/maleic anhydride), are well suited for use herein, preferably at a level of from about 0.1% to about 2% by weight of the emulsion. The partially hydrolyzed polyvinyl alcohols are especially advantageous for use in this invention.

The catalysts used in the copolymerization reaction are any of the known and conventional free radical polymerization catalysts heretofore used for the preparation of VAE copolymer latices and include inorganic peroxides such as hydrogen peroxide, sodium perchlorate and sodium perborate, inorganic persulfates such as sodium persulfate, potassium persulfate and ammonium persulfate and reducing agents such as sodium hydrogen sulfite. Catalyst (including co-catalyst reducing agent, if employed) is generally utilized at a level of from about 0.1% to about 1% by weight of total comonomers.

An alkaline buffering agent such as sodium bicarbonate, ammonium bicarbonate, sodium acetate, and the like, may be added to the aqueous system to maintain the pH at the desired level. The amount of buffer is generally about 0.01 to 0.5% by weight based on the monomers.

In order to maintain a minimum latex inherent viscosity of about 1.90, when employing an amount of surface active agent within the range required by this invention, e.g. from about 1-2% by weight of comonomers, it has been found necessary to add the surfactant and the vinyl acetate in at least two parts, one of which is present in the emulsion medium at the commencement of polymerization and the other of which is added as copolymerization progresses as hereinafter more fully disclosed. Thus, from about 25% to about 90%, and preferably from about 40% to about 60% by weight, of the total surface active agent, and from about 5% to about 90%, and preferably from about 10% to about 20% by weight, of the total vinyl acetate monomer, can be added to the reactor prior to the commencement of copolymerization with the balance of surfactant and the remaining vinyl acetate monomer being added to the reactor during the latter copolymerization phase.

The temperature and pressure of the copolymerization reaction herein can be selected at levels which have heretofore been employed in VAE emulsion copolymerization. Accordingly, temperatures of from about 70° F. to about 160° F. and pressures of 100 to 1000 p.s.i. can be used with good results. It is, of course, recognized by those skilled in the art that at the lower end of the temperature range, it may be necessary to employ a reducing agent to generate the free radical required for initiating copolymerization.

In the examples which follow, the following testing procedures are employed:

A. Inherent Viscosity 0.250 gm of latex solid is dispersed in 50-75 ml. 80% weight aqueous acetic acid solvent solution and the dispersion is heated under agitation at 50°-60° C. until the latex is fully dissolved. The viscosity of the aqueous acetic acid solvent solution is measured in a standard size 100 viscometer in a known manner to establish a viscosity base line. A 25 ml. quantity of the filtered latex solution is placed in a weighed 50 ml. beaker and the beaker is heated to evaporate the solvent. Upon weighing the beaker, the actual concentration of latex is determined in grams/100 cc. Three consecutive viscosity readings using the cleansed size 100 viscometer are determined for the latex solution. Inherent viscosity is calculated as follows:

$$\text{Relative viscosity} = \frac{\text{Solution time}}{\text{Solvent time}}$$

$$\text{Inherent viscosity} = \frac{\text{Ln Relative viscosity}}{\text{Concentration}}$$

B. Time of Set Test

A sheet of 10 inch × 15 inch No. 40 Kraft paper is secured on a smooth, clean, flat surface. Approximately 5 gm of a standard commercial latex and the same quantity of a latex which is to be compared with the standard latex are deposited approximately 3 inches from the upper end of the Kraft paper, sufficient distance being maintained between the samples so that they do not intermingle. A side by side film is then cast on the Kraft paper using a draw-down bar. After 10 seconds, a second, identical sheet of Kraft paper is placed over the cast films. To insure uniform contact, a roller is run over the paper sheets 2-3 times. After 15 seconds, the sheets are grasped at the top two corners and slowly and evenly pulled apart during which the degree of difference in paper tearing is observed. If, compared to the standard latex, the latex being compared pulls paper fibers before the standard latex, it is superior to the latter, if at the same time it is equal thereto and if after the standard, it is inferior thereto.

C. Creep Test

A sheet of 10 inch × 15 inch No. 40 Kraft paper is secured on a smooth, clean, flat surface. A film of 0.003 inch thickness and 7.5 inch width is cast on the paper allowing a 1.5 inch to 2.5 inch border on one side. Immediately thereafter, the coated sheet is covered with a second identical sheet of Kraft paper and uniform contact is assured by passing a roller 2 to 3 times over the sandwiched film. After a 24 hour conditioning period, 3 transverse strips are cut from the paper. The free tabs are carefully separated and the adhesive line is marked. One tab is attached to the top of an oven (100°-200° F. constant temperature) and the second tab is attached to a 200 gm weight such that stress is maintained on the adhesive join. The adhesive sample is maintained in the oven for 24 hours after which the amount of creep is measured.

D. Vinyl Wetting Test

A film of a latex being measured is cast on a 15 inch × 10 inch PVC sheet using a 0.003 inch draw-down bar. The film is observed for "fish eyes" and crawling. The less the film shows "fish eyes" and crawling, the better is the vinyl wetting performance of the latex.

E. Water Sensitivity

A 7 ml. film of a latex of this invention is cast side by side with the standard latex on a plate with a 6 inch wide 0.007 inch draw-down bar, care being taken not to intermingle film. After a 24 hour conditioning period, an inch wide circle of water is placed on each film. After one minute, using a constant back and forth finger motion, both films are rubbed to an equal extent until they are lifted from the glass plate. It is noted whether the latex of the invention is more adherent (superior), equal in adherence, or less adherent (inferior) than the standard latex film.

F. Mechanical Stability 300 grams of a latex of this invention are placed in a Waring Blender and stirred at high speed for five minutes. The latex is then filtered through a 200 mesh filter. No, or at most, only very little coagulum should be retained on the filter. The test is repeated with 300 grams of the latex diluted with water to 5% total solids concentration. A latex passing both tests can be considered mechanically stable.

In the following examples, VAE copolymer latices prepared in accordance with the invention are compared with a standard VAE copolymer latex having a solids content of 55%, a Brookfield viscosity (Spindle 3) at 2 rpm of 5,000 to 8,200 and at 20 rpm of 2,500 to 17,000, an inherent viscosity of 1.9-2.0 and a particle size of 0.50 microns.

EXAMPLES 1 to 3

These examples are illustrative of VAE copolymer latices prepared in accordance with this invention. The properties of the latices are compared with the standard VAE copolymer latex described above.

The following copolymerization recipes (Table 1) are prepared:

TABLE I

| | Copolymerization Recipes | | | | | | | | | |
|---|---|---|---|---|---|---|---|---|---|---|
| Example | Vinyl Acetate gm parts/100 parts | Ethylene gm parts/100 parts | Water gm parts/100 parts | Gelvatol[1] 20-30 gm parts/100 parts | Gelvatol[1] 20-60 gm parts/100 parts | Pluronic[2] L-64 gm parts/100 parts | (Buffer) NaHCO$_3$ gm parts/100 parts | Catalyst System K$_2$S$_2$O$_8$ gm parts/100 parts | NaHSO$_3$ gm parts/100 parts | V-100[3] gm parts/100 parts |
| 1 | 5,450 / 46.122 | 860 / 7.278 | 5,150 / 43.584 | 190 / 1.608 | 60 / 0.508 | 80 / 0.677 | 6.2 / 0.052 | 18 / 0.152 | 2.18 / 0.016 | — |
| 2 | 5,450 / 45.731 | 860 / 7.216 | 5,250 / 44.053 | 190 / 1.594 | 60 / 0.503 | 80 / 0.671 | 6.2 / 0.052 | 18 / 0.151 | 2.18 / 0.018 | 1 / 0.008 |
| 3 | 5,450 / 45.731 | 860 / 7.216 | 5,250 / 44.053 | 190 / 1.594 | 60 / 0.503 | 80 / 0.671 | 6.2 / 0.052 | 18 / 0.151 | 3.06 / 0.020 | 1 / 0.008 |

[1] Gelvatol 20-30 and 20-60 (Monsanto) - a partly hydrolyzed polyvinyl alcohol resin used as a protective colloid
[2] Pluronic L-64 (BASF Wyandotte) - nonionic surface active agent which is a condensate of ethylene oxide and a hydrophobic base.
[3] Versene-100 (Dow) - aqueous solution of the tetrasodium salt of ethylenediaminetetraacetic acid employed as chelating agent.

The copolymerization is carried out in a 5 gallon capacity reactor according to the following procedure:

(1) In a separate container provided with an agitator, Gelvatols 20-30 and 20-60 are suspended with agitation in cold distilled water. The suspension is heated to 130°–140° F. and stirred until full dissolution of the polyvinyl alcohol is attained. Preferably, the solution is filtered before being charged to the reactor.

(2) The main charge of vinyl acetate is charged to the vinyl acetate feed tank.

(3) The NaHSO$_3$ is dissolved in distilled water and charged to the catalyst feed tank.

(4) The polyvinyl alcohol solution, the initial charge of vinyl acetate, 50% of the Pluronic requirements, the V-100, the NaHCO$_3$, and the K$_2$S$_2$O$_8$ are charged to the reactor.

(5) The reactor is flushed with N$_2$ for five minutes.

(6) The reactor is closed.

(7) The reactor is heated (120° F.) and pressurized with ethylene (425 psig). This pressure is kept constant throughout the run.

(8) One hundred cc (70% of the total) of the NaHSO$_3$ solution is pumped to the reactor.

(9) Once it is noticed that the reaction has started as indicated by a decreasing cooling temperature, the pumping of the main vinyl acetate charge is started, and completed over a period of approximately 135 minutes.

(10) The final charge of vinyl acetate and the remaining 50% requirements of Pluronic L-64 are charged to the vinyl acetate feed tank.

(11) Upon completion of the addition of the main vinyl acetate charge, the reaction continues for approximately 3–3½ hours. When the reaction is almost completed as indicated by a cooling temperature which is 2°–3° F. below the reaction temperature of 120° F.:

(a) The remaining 30% of the NaHSO$_3$ solution is pumped to the reactor.

(b) The final charge of vinyl acetate/Pluronic L-64 is pumped to the reactor. The temperature control is set on "Manual" and the reaction temperature is raised to a maximum of 160°–170° F. The ethylene pumping is shut off upon completion of the vinyl acetate/Pluronic L-64 addition.

(12) The batch is held at maximum temperature for about ½ hour.

(13) The batch is cooled and is let-down to atmospheric pressure.

The copolymerization operating conditions for the recipes of Examples 1 to 3 are summarized in Table II as follows:

TABLE II

| | Copolymerization Operation Data | | | | | | | | | | |
|---|---|---|---|---|---|---|---|---|---|---|---|
| | | | | Addition Mode | | | | | | | |
| | | | | | Vinyl Acetate[2] (gm) | | | Catalyst System | | Surfactant | |
| EXAMPLE | Polymerization Temperature °F. | Burn-Off[1] Temp. °F. | Polymerization Time Hours | Ethylene | 1st Stage | 2nd Stage | 3rd Stage | Peroxide | Reducing Agent | Initial | Final[3] |
| 1 | 120 | 170 | 5½ | Constant Pressure 425 psi | 550 | 4300 | 600 | K$_2$S$_2$O$_8$ Charged initially | NaHSO$_3$ Pump in | 50 | 50 |
| 2 | 120 | 175 | 8 | Constant Pressure 425 psi | 550 | 4300 | 600 | K$_2$S$_2$O$_8$ Charged initially | NaHSO$_3$ Pump in | 50 | 50 |
| 3 | 120 | 175 | 9 | Constant Pressure 425 psi | 4850 | — | 600 | K$_2$S$_2$O$_8$ Charged initially | NaHSO$_3$ Pump in | 50 | 50 |

NOTE: Protective colloid and buffer charged initially.
[1] Burn-off (polymerization) of remaining unreacted vinyl acetate is carried out shortly before or after completion of monomer addition.
[2] 1st Stage - Initial Charge
2nd State - Delayed addition during major part of the reaction.
3rd Stage - Final addition for burn-off and remaining surfactant charge
[3] Dissolved in the 3rd stage of vinyl acetate.

The performance characteristics of the VAE copolymer latices of Examples 1 to 3 as compared with those of the standard latex are set forth in Table III as follows:

TABLE III

VAE Copolymer Latices Performance Tests Results

| Example | Total Solids % | Viscosity[1] Brookfield 2 RPM | Viscosity[1] Brookfield 20 RPM | Inherent Viscosity | Time of Set [2] | Creep Test at 140° F. mm | Vinyl Wetting[2] | Water Sensitivity[2] | Mechanical Stability |
|---|---|---|---|---|---|---|---|---|---|
| Standard Latex | 55 | 5000 to 8200 | 2500 to 1700 | 1.9–2.0 | — | 0–2 | — | — | Passes |
| 1 | 55.9 | 7750 | 2350 | 1.99 | Superior | 4 | Superior | Equal | Passes |
| 2 | 55.0 | 4750 | 1750 | 1.95 | Superior | 4 | Superior | Equal | Passes |
| 3 | 55.2 | 4500 | 1475 | 1.93 | Superior | 14 | Superior | Equal | Passes |

[1] Spindle 3
[2] Compared with the standard latex.

As these data demonstrate, the process of preparing VAE copolymer latices in accordance with this invention provides latices having a good combination of performance properties which makes them particularly well suited for use as adhesives. While the latices herein were slightly inferior to the standard latex in the Creep Test, their performance levels in this test were well within commercially acceptable limits. Overall performance was, however, significantly improved.

What is claimed is:

1. A process for preparing vinyl acetate-ethylene copolymer latices having an inherent viscosity of not less than about 1.90 measured upon solution of 0.250 gm of latex in 50–75 ml of 80% weight aqueous acetic acid heated to 50°–60° C., and demonstrating superior performance in the Time of Set Test and Vinyl Wetting Test which comprises copolymerizing from about 60% to about 95% by weight of vinyl acetate monomer with from about 40% to about 5% by weight of ethylene monomer is an emulsified reaction medium containing:
   (a) at least one surface active agent in an amount of not less than 1.0% by weight, and not more than 2.0% by weight, of the total monomer;
   (b) a catalyst, and
   (c) a protective colloid, the total weight of the surface active agent and vinyl acetate monomer being introduced into the reaction medium in delayed increments prior to and after the commencement of copolymerization.

2. The process of claim 1 wherein in addition to ethylene, at least one other ethylenically unsaturated comonomer is copolymerized with the vinyl acetate.

3. The process of claim 1 wherein the surface active agent is a nonionic surface active agent selected from the group consisting of (i) the alkylphenoxypoly(ethyleneoxy)ethanols, (ii) the polyoxalkylene derivatives of hexitol or partial long-chain fatty acid esters, (iii) condensates of ethylene oxide with a hydrophobic base, and (iv) ethylene oxide derivatives of long-chain fatty alcohols.

4. The process of claim 1 wherein from about 1.2% to about 1.5% total surface active agent is employed.

5. The process of claim 1 wherein the protective colloid is employed in the emulsified reaction medium at from about 0.1% to about 2.0% by weight thereof.

6. The process of claim 1 wherein the protective colloid is a partially hydrolyzed polyvinyl alcohol.

7. The process of claim 1 wherein from about 25% to about 90% by weight of the total surface active agent is present in the emulsified reaction medium at the beginning of the copolymerization reaction.

8. The process of claim 1 wherein from about 5% to about 90% by weight of the total vinyl acetate monomer is present in the emulsified reaction medium at the beginning of the copolymerization reaction.

* * * * *